United States Patent Office 3,246,019
Patented Apr. 12, 1966

3,246,019
3-(SUBSTITUTED)AMINO-17β-CARBOXY-ANDROSTANES
Leslie A. Freiberg, Waukegan, and John Wayne Cole, Deerfield, Ill., assignors to Abbott Laboratories, North Chicago, Ill., a corporation of Illinois
No Drawing. Filed June 10, 1964, Ser. No. 374,161
11 Claims. (Cl. 260—397.1)

The present invention is directed to new steroids. More particularly, the present invention is concerned with the manufacture of 3-(substituted)amino-17β-carboxyandrostanes and the loweralkyl esters thereof.

The new compounds are members of the class represented by the formula

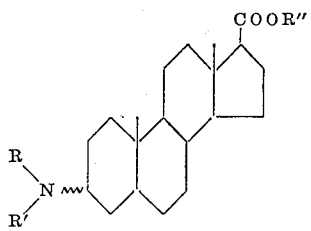

wherein R, R' and R" are all loweralkyl or hydrogen, R' may further be a lower fatty acid acyl group. Representative examples of the new class of steroids falling within the above definition are the 3β-dimethylamino-17β-carbomethoxyandrostane and the 3α-amino-17β-carboxyandrostane. The new compounds show valuable growth-regulating activity and, in some cases have in addition thereto anabolic activity in warm-blooded animals, without the classical hormonal effects of androgens. The compounds of the present invention can be made by heating in a closed container a 17β-carboalkoxyandrostane or a 17β-carboxyandrostane carrying at 3 a loweralkyl sulfonoxy or an arylsulfonoxy substituent in the α- or β-position, with ammonia, a primary or secondary loweralkyl amine. A temperature of at least 75° C. for a period of at least 1 hour should be maintained for the above reaction. The preferred temperature range for the reaction is between 75° and 160° C. and the heating period should be extended preferably for a period between 1 and 30 hours. Obviously, where the lower temperatures within the above range are used, heating for a longer period of time is indicated to obtain a sufficient yield, while at the higher temperatures within the above range, a heating period of 1 to 3 hours is sufficient to obtain satisfactory yield.

As shown above, the starting materials for the process of the present invention are the derivatives of 3α- or 3β-hydroxy-17β-carboxyandrostanes or the corresponding loweralkyl esters which are esterified in the 3-position with an aryl or loweralkylsulfonic acid, e.g., the methanesulfonoxy-, benzenesulfonoxy- and toluenesulfonoxy-derivatives of the above androstanes. The reaction between the desired amines and the above 3-sulfonoxy ester of androstane-17-carboxylic acid (or ester) can be carried out in the presence or absence of a solvent. If a solvent is used, an inert organic liquid with a relatively low vapor-pressure is preferred. The term "inert" signifies that the organic liquid does not react with either reactant or the product formed. Depending on the stereoposition of the 3-substituent in the starting material, the 3α-amino or 3β-amino compounds are obtained. However, it will be seen from the examples that when the starting material carries the substituent in the 3α-position, a 3β-amino compound is obtained, and vice versa.

In order to illustrate the process of the present invention, reference is made to the following examples which are not meant to limit the invention in any way. In these examples, wherever reference is made to a mixture of solvents and no ratio of such solvents is given, it is to be understood that the first named solvent is used to dissolve the material to make a concentrated solution, and the second solvent is then added to induce or complete crystallization.

Example 1.—3α-amino-17β-carbomethoxy-5α-androstane

A mixture of 3.60 grams of 3β-p-toluenesulfonoxy-17β-carbomethoxy-5α-androstane of melting point 152–154° C. and 80 ml. of liquid ammonia are heated to 100° C. in a stainless steel bomb for 15 hours. At the end of this period, the ammonia is evaporated and the product is washed from the bomb with alternate portions of ethyl ether and 10% sodium hydroxide. The ether is separated, washed with water, dried with anhydrous magnesium sulfate, and evaporated, leaving 1.90 grams of crude 3α-amino-17β-carbomethoxy-5α-androstane. Purification of this compound is accomplished by absorbing a solution thereof in 20 ml. of benzene onto a column containing 120 grams of magnesium silicate activated as described in U.S. 2,393,625 (marketed as Florisil) from which it is eluated first with benzene followed by gradient elution with benzene/methanol. The major consecutive fractions are combined and evaporated to leave 1.59 grams of the above compound melting at 130–135° C. Crystallization from methanol/water produces the pure compound melting at 134–135° C. The analytical values obtained for this compound are in agreement with those calculated for the compound of empirical formula $C_{21}H_{35}NO_2$.

Example 2.—3α-amino-17β-carboxy-5α-androstane

To a solution of 250 mg. of 3α-amino-17β-carbomethoxy-5α-androstane in 30 ml. of methanol is added 10 ml. of water containing 0.5 gram potassium hydroxide. The mixture is refluxed overnight and then cooled and filtered and the solution is neutralized with 1.0 N hydrochloric acid. The crystals of 3α-amino-17β-carboxy-5α-androstane are collected and dried at 60° C. and 1.0 mm. pressure and thereafter sublimed at 240° C. and 1.0 mm. pressure, to produce the pure compound with a melting point of 316–320° C. (decomposition) in a sealed, evacuated capillary. The analytical values found for this material are in close agreement with those calculated for the formula $C_{20}H_{33}NO_2 \cdot H_2O$.

Example 3.—3α-acetamido-17β-carbomethoxy-5α-androstane

To a solution of 487 mg. of 3α-amino-17β-carbomethoxy-5α-androstane in 20 ml. of pyridine is added 11 ml. of acetic anhydride and the mixture is allowed to stand at 25° C. overnight. The reaction mixture is then poured onto ice and the product extracted with ether. The ether extracts are washed with 3 N hydrochloric acid, 10% sodium hydroxide, and finally with water. The ether is dried with anhydrous magnesium sulfate and evaporated, giving 400 mg. of 3α-acetamido-17β-carbomethoxy-5α-androstane melting at 208–209° C. after crystallization from benzene/hexane. The analytical values found for this compound are in close agreement for those calculated for the compound of empirical formula $C_{22}H_{37}NO_3$.

Example 4.—3α-acetamido-17β-carboxy-5α-androstane

To a solution of 340 mg. of 3α-amino-17β-carboxy-5α-androstane in 15 ml. of pyridine is added 11.5 ml. of acetic anhydride and the mixture is allowed to stand overnight at 25° C. The reaction mixture is then poured onto cracked ice and the product is dissolved in chloroform and washed with 3 N hydrochloric acid and water. The chloroform solution is worked up in the usual manner to produce crude 3α-acetamido-17β-carboxy-5α-androstane which is crystallized from methanol/water to yield 170 mg. of the pure product melting at 280–281° C. in a sealed evacuated capillary. The analytical values found are in close agreement with those calculated for the formula $C_{22}H_{35}NO_3$.

*Example 5.—3α-(N,N-dimethylamino)-17β-carbomethoxy-5α-androstane*

A mixture of 1.38 grams of 3β-hydroxy-17β-carbomethoxy-5α-androstane 3-p-toluenesulfonate melting at 152–154° C. and 40 ml. of dimethylamine are heated to 100° C. in a stainless steel bomb for 15 hours. The bomb is then cooled and excess dimethylamine is evaporated therefrom. The bomb is washed alternately with portions of ethyl ether and 12 N ammonium hydroxide. The aqeuous phase is separated and the ether layer is washed with 6 N ammonium hydroxide and water. The ether is dried with anhydrous magnesium sulfate and evaporated, giving 0.97 gram of crude 3α-(N,N-dimethylamino)-17β-carbomethoxy-5α-androstane. Recrystallization from methanol gives 546 mg. of the pure compound melting at 182–185.5° C. in a sealed evacuated capillary. The analytical values found are in close agreement with those calculated for the formula $C_{23}H_{39}NO_2$.

When, in the above example, dimethylamine is replaced with ethylamine, 3α-ethylamino-17β-carbomethoxy-5α-androstane is obtained. The acylation procedure used on this compound produces 3α-N-ethyl-N-acetamido-17β-carbomethoxy-5α-androstane.

*Example 6.—3α-(N,N-dimethylamino)-17β-carboxy-5α-androstane*

In a manner similar to that described in Example 2, 270 mg. of 3α-(N,N-dimethylamino)-17β-carbomethoxy-5α-androstane is converted to 3α-(N,N-dimethylamino)-17β-carboxy-5α-androstane which after sublimation at 230° C. and 0.1 mm. pressure, has a melting point of 275–278° C. (decomposition) in a sealed evacuated capillary.

From 3α-ethylamino-17β-carbomethoxy-5α-androstane the above procedure produces 3α-ethylamino-17β-carboxy-5α-androstane.

*Example 7.—3β-amino-17β-carbomethoxy-5β-androstane*

In a manner similar to that described in Example 1, 5.60 grams of 3β-p-toluenesulfonoxy-17β-carbomethoxy-5β-androstane is converted to 3.42 grams of crude 3β-amino-17β-carbomethoxy-5β-androstane. Purification of this material is accomplished by absorption onto 120 grams of Florisil and subsequent elution with n-pentane/benzene/piperidine (200:130:1). The major fractions are collected and are combined and evaporated to leave a residue of 2.59 grams of the above compound, melting at 134–136° C. A small sample crystallized from methanol/water shows a melting point of 135–136.5° C. The analytical values are in close agreement with those calculated for the formula $C_{21}H_{35}NO_2$.

*Example 8.—3β-amino-17β-carboxy-5β-androstane*

In a manner similar to that described in Example 2 above, 1.70 grams of 3β-amino-17β-carbomethoxy-5β-androstane is converted to 1.6 grams of 3β-amino-17β-carboxy-5β-androstane which after sublimation at 230–235° C. and 0.1 mm. pressure shows a melting point of 314–317° C. (decomposition) in a sealed evacuated capillary. The analytical values found are in close agreement with those calculated for the formula $C_{20}H_{33}NO_2$.

*Example 9.—3β-acetamido-17β-carbomethoxy-5β-androstane*

In a manner similar to that of Example 3 above, 420 mg. of 3β-amino-17β-carbomethoxy-5β-androstane are converted to 3β-acetamido-17β-carbomethoxy-5β-androstane which, after crystallization from methanol/water, gives 366 mg. of 3β-acetamido-17β-carbomethoxy-5β-androstane melting at 120° C. and again at 169–170° C. The analytical values are in close agreement with those calculated for the formula $C_{23}H_{37}NO_3$.

*Example 10.—3β-acetamido-17β-carboxy-5β-androstane*

In a manner similar to that described in Example 4 above, 303 mg. of 3β-amino-17β-carboxy-5β-androstane are converted to 3β-acetamido-17β-carboxy-5β-androstane. After two crystallizations from methanol/water, 224 mg. of the pure product melting at 241–243.5° C. is obtained. The analytical values are in close agreement with those calculated for the formula $C_{22}H_{35}NO_3$.

As will be seen from the above examples, the above process produces the 3α-amino or 3β-amino derivatives of androstane-17-carboxylic acid or the corresponding loweralkyl esters. The amino group can easily be substituted by replacing the ammonia used in the reaction of Example 1 or Example 7 with the equivalent amount of an amine of the formula RNHR′ wherein R and R′ can be the same or different loweralkyl substituents. The corresponding mono-substituted amines can be made in the same fashion by using an amine of the formula $RNH_2$ wherein R is a loweralkyl substituent. The mono-substituted amino compounds can also be made from the unsubstituted amino compounds by first making a Schiff base with the appropriate loweralkyl aldehyde and subsequent reduction of the Schiff base with hydrogen and Raney nickel as the catalyst.

Although the above examples demonstrate the process using a carbomethoxy substituent at the 17-position of the starting material, other loweralkyl esters or the free carboxylic acid can be used equally well. It will be apparent that any given 17-carbalkoxy derivatives can be converted first into the free 17-carboxylic derivatives from which another alkyl ester of the free acid can be obtained by known ways.

The starting materials used in the process of the present invention are prepared from the known hydroxy acids and esters by reaction with an aryl (or alkyl) sulfonyl chloride in pyridine solution, for example as described in Helv. Chim. Acta, volume 26, page 2272 (1943). The various hydroxy acids and esters are described in the above reference and in Chem. Berichte, 68, 1814 (1935); Helv. Chim. Acta, 20, 949 (1937); 23, 658 (1940); 29, 718 (1946); 30, 1976 (1947) and 46, 392 (1963).

Others may practice the invention in any of the numerous ways which will be suggested to one skilled in the art by the present disclosure. All such practice of the invention is considered a part hereof provided it falls within the scope of the appended claims.

We claim:
1. A steroid of the formula

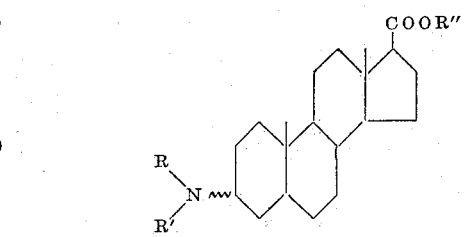

wherein R and R″ are both selected from the group consisting of hydrogen and A, and wherein R′ is selected from the group consisting of hydrogen, A, and ACO, wherein A stands for loweralkyl.
2. 3α-amino-17β-carbomethoxy-5α-androstane.
3. 3α-amino-17β-carboxy-5α-androstane.
4. 3α-acetamido-17β-carbomethoxy-5α-androstane.
5. 3α-acetamido-17β-carboxy-5α-androstane.
6. 3α-(N,N-dimethylamino)-17β-carbomethoxy-5α-androstane.

7. 3α-(N,N-dimethylamino)-17β-carboxy-5α-androstane.
8. 3β-amoni-17β-carbomethoxy-5β-androstane.
9. 3β-amino-17β-carboxy-5β-androstane.
10. 3β-acetamido-17β-carbomethoxy-5β-androstane.
11. 3β-acetamido-17β-carboxy-5β-androstane.

References Cited by the Examiner
UNITED STATES PATENTS
3,119,817  1/1964  Tadanier et al. ____ 260—239.55

LEWIS GOTTS, *Primary Examiner.*
H. A. FRENCH, *Assistant Examiner.*